(12) United States Patent
Lv

(10) Patent No.: US 8,182,148 B2
(45) Date of Patent: May 22, 2012

(54) X-RAY DETECTOR SYSTEM

(75) Inventor: Xun Lv, Beijing (CN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 301 days.

(21) Appl. No.: 12/629,405

(22) Filed: Dec. 2, 2009

(65) Prior Publication Data
US 2010/0135468 A1 Jun. 3, 2010

(30) Foreign Application Priority Data

Dec. 3, 2008 (CN) .......................... 2008 1 0179770

(51) Int. Cl.
H05G 1/00 (2006.01)
(52) U.S. Cl. .................. 378/204; 378/189; 378/98.8
(58) Field of Classification Search ............... 378/98.8, 378/189, 204; 250/370.08, 370.09
See application file for complete search history.

(56) References Cited

U.S. PATENT DOCUMENTS

| 4,814,693 A | 3/1989 | Coben .............................. 324/66 |
| 4,881,792 A | 11/1989 | Alameel et al. ................. 385/56 |
| 6,287,018 B1 | 9/2001 | Andrews et al. ................ 385/60 |

Primary Examiner — Courtney Thomas
(74) Attorney, Agent, or Firm — Armstrong Teasdale LLP

(57) ABSTRACT

An X-ray detector system includes a detector and a mounting apparatus for mounting the detector, the detector comprising a cable comprising a first end and a second end, the first end connected to the detector and the second end coupled to the mounting apparatus, the cable configured to transmit a signal detected by the detector to an imaging processor located in the mounting apparatus, the second end of the cable comprises a plug, the mounting apparatus comprises a socket matching with the plug on the cable such that the plug is configured to be removed from the socket, the X-ray detector system further comprising a jumper wire comprising two ends that are respectively provided with plugs that are configured to be selectively matched with or detached from the plug on the cable and the socket on the mounting apparatus.

20 Claims, 4 Drawing Sheets

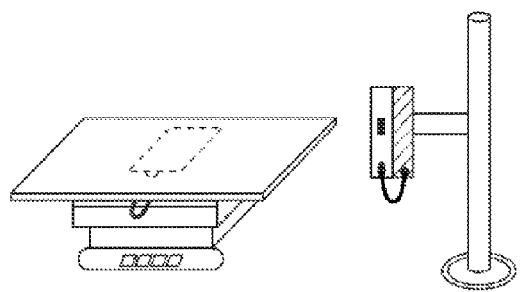
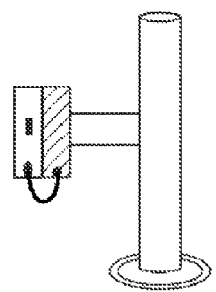
Fig. 1A
PRIOR ART
Fig. 1B
PRIOR ART
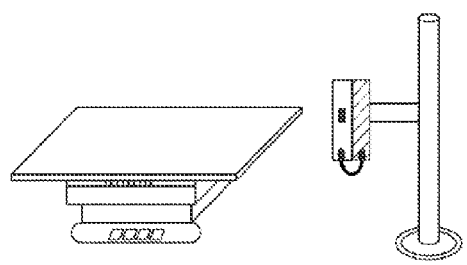
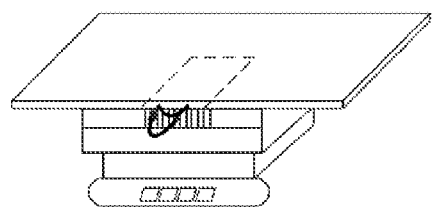
Fig. 1C
PRIOR ART
Fig. 1D
PRIOR ART

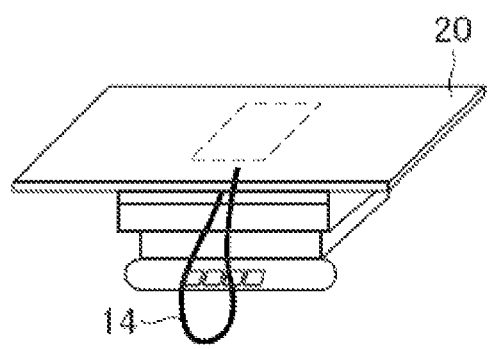
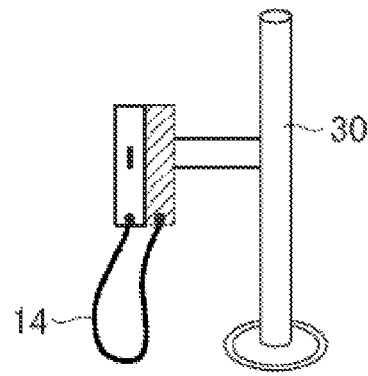
Fig. 5A Fig. 5B
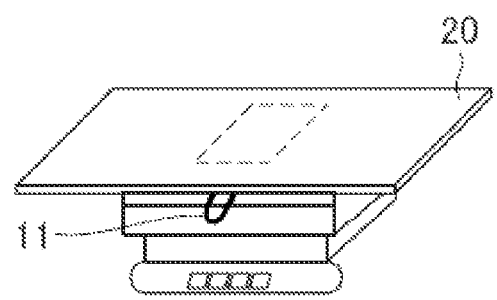
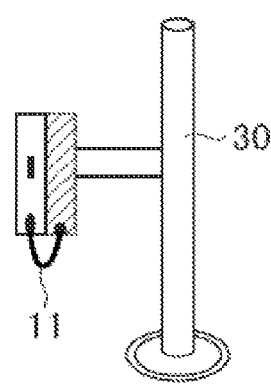
Fig. 5C Fig. 5D

X-RAY DETECTOR SYSTEM

CROSS REFERENCE TO RELATED APPLICATIONS

This application claims the benefit of Chinese Patent Application No. 200810179770.1 filed Dec. 3, 2008, which is hereby incorporated by reference in its entirety.

BACKGROUND OF THE INVENTION

The embodiments described herein relate to a medial device technology, and in particular relate to an X-ray detector system used for radiography.

An X-ray detector system used for radiography generally comprises an X-ray detector and an mounting means, such as a scan table or a wall stand, for mounting the X-ray detector. The X-ray detector in the existing digital radiographic machine has two kinds of application modes, one is that the detector is placed within the table or wall stand, and the other is that the detector is placed neither in the table nor in the wall stand. Different system configurations have different requirements, such as in FIGS. 1A, 1B, 1C, and 1D. FIG. 1A requires two X-ray detectors to satisfy a system configuration having both the wall stand and the table, FIG. 1B adopts a configuration of one detector configured with one single wall stand, FIG. 1C adopts a shared X-ray detector to satisfy a system configuration having both the wall stand and the table, and FIG. 1D adopts a configuration of one detector configured with one single table. In these configurations, respective detectors cannot be randomly taken off to be applied to another configuration system, thus reducing portability of the detectors.

BRIEF DESCRIPTION OF THE INVENTION

One aspect provides an X-ray detector system, whose X-ray detector and mounting means for mounting the X-ray detector are configured in a flexible way, such that the X-ray detector can be conveniently taken off and mounted, and can be conveniently swapped in portable and non-portable applications.

Another aspect provides an X-ray detector system, which comprises a detector and a mounting means for mounting the detector, said detector comprising a cable, which is connected to the detector at one end, and to the mounting means at the other end, via which the signal detected by the detector is transmitted to an imaging processing means within the mounting means, said cable being provided with a plug on one end, said mounting means being provided with a socket matching the plug on the cable which can be conveniently taken off from said plug; and further comprising a jumper wire whose two ends are respectively provided with plugs that can match with or be detached from the plug on the cable and the socket on the mounting means.

The plug on said cable and the plug on the jumper wire are of the same type.

The mounting means is provided with a protective plate to protect the socket when the socket is not plugged with a plug.

Said protective plate can be self-returnably arranged onto the mounting means, and when the plug of the cable or the plug of the jumper wire is taken off from the socket, said protective plate can automatically return to an original position to protect the socket by covering it.

Said mounting means is further provided with a cable fixing slot.

In one aspect, a jumper wire is used as the extension cable to make the portable configuration more flexile so that the user can adjust the position of the detector at will; and to allow a random swapping of the detector between the non-portable configuration mode and portable configuration mode. Meanwhile, since said jumper wire is detachable, when under the non-portable configuration mode, the user can put said jumper wire away, thereby making the system to be neater to prevent the user from being stumbled by said jumper wire.

BRIEF DESCRIPTION OF THE DRAWINGS

FIGS. 1A, 1B, 1C and 1D are drawings of the configuration of the existing X-ray detector system;

FIGS. 5A, 5B, 5C, and 5D are schematic drawings of the X-ray detector system of the present invention being applied to a non-portable system configuration;

DETAILED DESCRIPTION OF THE INVENTION

The modes of carrying out this invention will be described in detail with reference to the drawings. The present invention is not limited to these modes.

Figure 2:
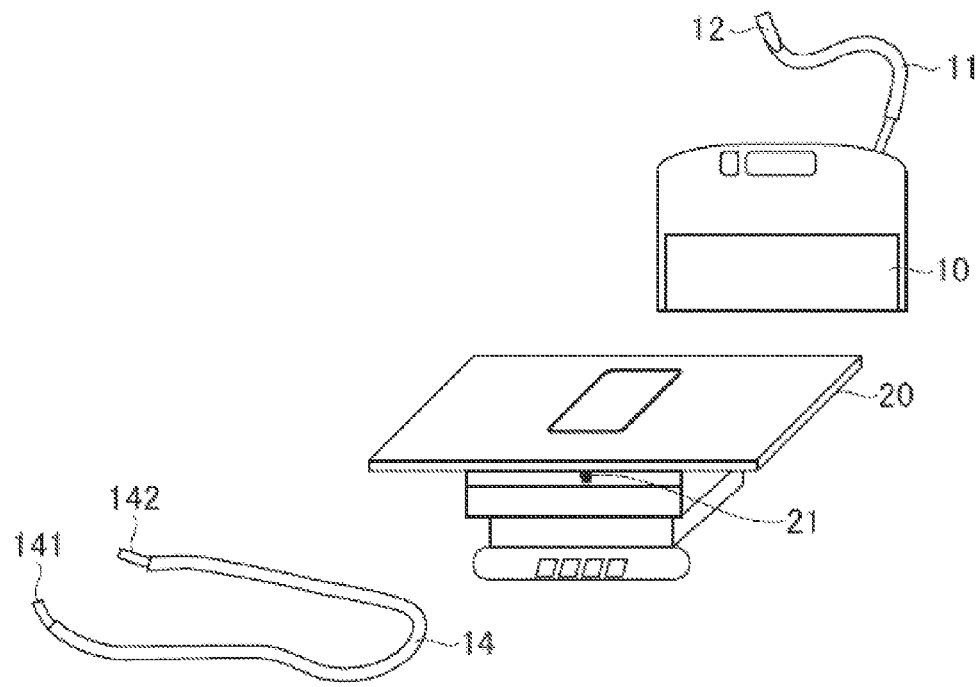
FIG. 2 is a schematic drawing of the X-ray detector system of the present invention.
Figure 3:
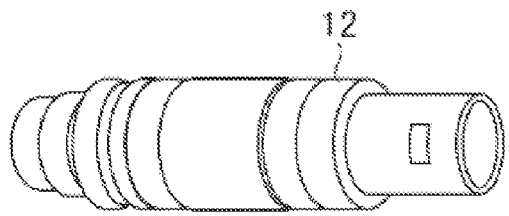
FIG. 3 is a structural schematic drawing of an embodiment of the plug of the present invention.

As shown in FIG. 2, the X-ray detector system of the present invention comprises a detector 10, a mounting means 20 for mounting and placing the detector 10. Said detector 10 has a cable 11 for establishing connection with an imaging processing means (not shown) in the mounting means 20 so as to transmit the signal received by the detector to the imaging processing means for processing. Said cable 11 is connected to the detector 10 at one end, and the other end thereof comprises a plug 12. Referring to FIG. 3, it is an embodiment of the plug 12 of the present invention. One end of the plug 12 is a pin and the other end is a jack, and when plugs of the same type fit together, they can match with each other via pins.

Figure 4:
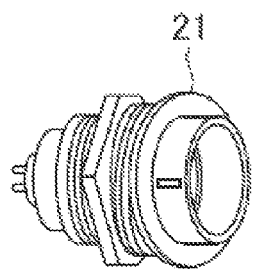
FIG. 4 is a structural schematic drawing of an embodiment of the socket of the present invention.

Said mounting means 20 can be either a scan table or a wall stand, and in the present embodiment, it is a scan table. The mounting means 20 is provided with a socket 21 that matches the plug 12 of the cable 11 on the detector 10, and the cable 11 contacts said socket 21 through matching with it, i.e. the signal obtained by the detector 10 can be transmitted to the imaging processing means in the mounting means 20. FIG. 4 shows an embodiment of the socket 21 of the present invention.

The present invention further comprises a jumper wire 14 provided with plugs 141 and 142 on two ends respectively, which can match with the plug 12 of the cable 11 and the socket 21 on the mounting means 20. The plugs 141 and 142 and the plug 12 are of the same type. Said jumper wire 14 makes the detector 10 more portable.

The following will explain by examples the swapping of the X-ray detector system of the present invention between the portable application and non-portable application. The detector 10 has two connection points, one is on the scan table 20, and the other is on the wall stand 30. A housing for accommodating the detector 10 is provided on the scan table 20 and the wall stand 30, respectively.

As shown in FIGS. 5A, 5B, 5C, and 5D, when a user wants to configure a portable application mode, the following operations are required: taking the cable 11 of the detector 10 off from the scan table 20 or wall stand 30, moving the detector 10 out of the housing of the scan table 20 or wall stand 30, connecting the plugs 141 and 142 on the two ends of the jumper wire 14 to the plug 12 of the cable 11 of the detector 10 and the socket 21 of the scan table 20 or the wall stand 30, then said system is configured into a portable digital application mode.

Figures 5E, 5F:
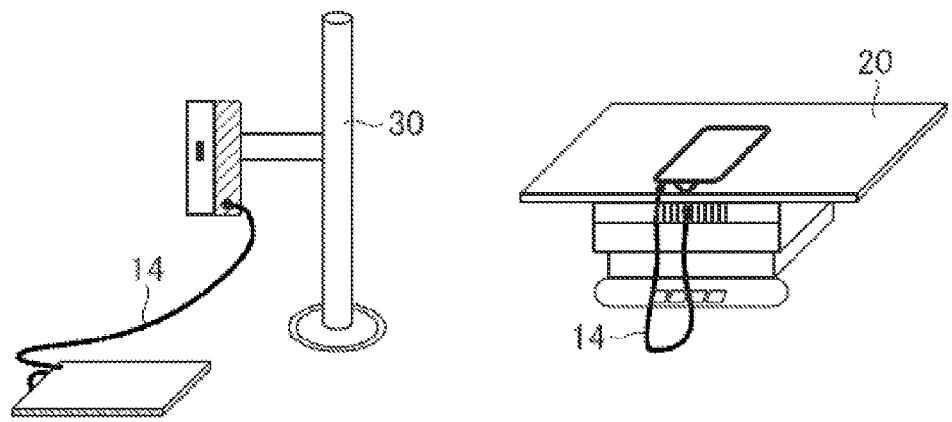
FIGS. 5E and 5F are schematic drawings of the X-ray detector system of the present invention being applied to a portable system configuration.

As shown in FIGS. 5E and 5F, when the user wants to configure a non-portable application mode, the following operations are needed: placing the detector into the housing of the scan table 20 or the wall stand 30, establishing a connection between the detector 10 and the scan table 20 or the wall stand 30 through the cable 11 or the jumper wire 14 on the detector 10.

Figure 6:
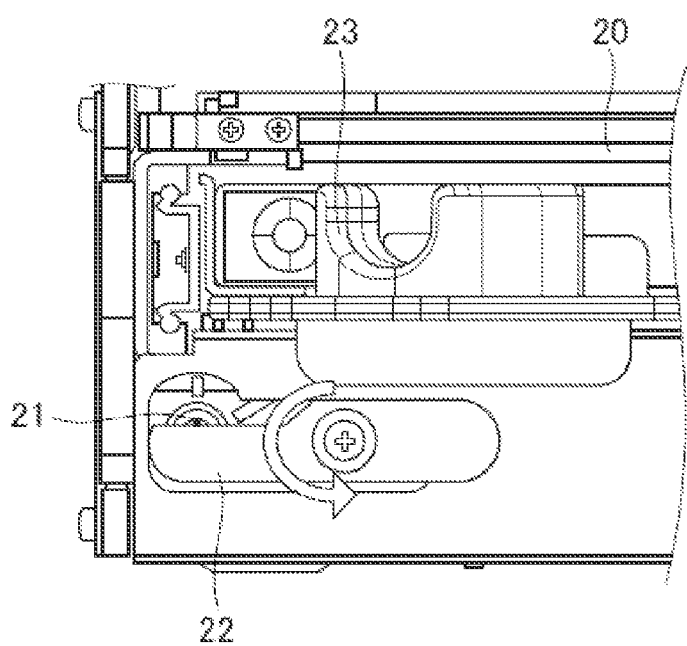
FIG. 6 is a schematic drawing of the protective plate and the cable fixing slot on the mounting means of the present invention.

As shown in FIG. 6, said mounting means 20 is provided with a protective plate 22 to protect the socket 21 when the socket 21 is not plugged with a plug. Said protective plate 22 is self-returnably arranged onto the mounting means 20. When the plug 12 of the cable 11 or the plug of the jumper wire 14 is taken off from the socket 21, said protective plate 22 can automatically return to the original position to protect the socket by covering it.

For securing and positioning the cable 11 on the detector 10, said mounting means 20 is further provided with a cable fixing slot 23.

What is claimed is:

1. An X-ray detector system, comprising a detector and a mounting means for mounting the detector, the detector comprising a cable comprising a first end and a second end, the first end connected to the detector and the second end coupled to the mounting means, the cable configured to transmit a signal detected by the detector to an imaging processing means located in the mounting means, the second end of the cable comprises a plug, the mounting means comprises a socket matching with the plug on the cable such that the plug is configured to be removed from the socket, the X-ray detector system further comprising a jumper wire comprising two ends that are respectively provided with plugs that are configured to be selectively matched with or detached from the plug on the cable and the socket on the mounting means.

2. The X-ray detector system as claimed in claim 1, wherein the plug on the cable and the plug on the jumper wire are of the same type.

3. The X-ray detector system as claimed in claim 1, wherein the mounting means comprises a protective plate configured to protect the socket when the socket is not plugged with a plug.

4. The X-ray detector system as claimed in claim 3, wherein the protective plate is self-returnably arranged on the mounting means, such that the protective plate is configured to automatically return to an original position to protect the socket by covering the socket in response to the plug of the cable or the plug of the jumper wire being removed from the socket.

5. The X-ray detector system as claimed in claim 1, wherein the mounting means further comprises a cable fixing slot.

6. The X-ray detector system as claimed in claim 2, wherein the mounting means further comprises a cable fixing slot.

7. The X-ray detector system as claimed in claim 3, wherein the mounting means further comprises a cable fixing slot.

8. The X-ray detector system as claimed in claim 4, wherein the mounting means further comprises a cable fixing slot.

9. An X-ray detector system, comprising:
a detector configured to detect X-rays and to generate a signal based on the detected X-rays, the detector comprising a cable comprising a first end and a second end, the second end comprising a cable plug;
a mounting means comprising an imaging processing means, a socket sized to receive the cable plug, and a cable fixing slot, the mounting means coupled to the second end of the cable; and
a jumper wire comprising a first end comprising a first jumper wire plug and a second end comprising a second jumper wire plug, each jumper wire plug configured to be selectively coupled to or removed from the cable plug and the socket.

10. The X-ray detector system as claimed in claim 9, wherein the cable plug and the first and second jumper wire plugs are of the same type.

11. The X-ray detector system as claimed in claim 9, wherein the mounting means further comprises a protective plate configured to protect the socket when the socket is not coupled to any of the cable plug, the first jumper wire plug, and the second jumper wire plug.

12. The X-ray detector system as claimed in claim 11, wherein the protective plate is self-returnably arranged on the mounting means, such that the protective plate is configured to automatically return to an original position to protect the socket by covering the socket in response to the cable plug, the first jumper wire plug, or the second jumper wire plug being removed from the socket.

13. A method of assembling an X-ray detector system, the method comprising:
providing a detector configured to detect X-rays and to generate a signal based on the detected X-rays, the detector including a cable having a first end and a second end, the second end having a cable plug;
coupling a mounting means to the second end of the cable via a socket sized to receive the cable plug; and
selectively removing the cable plug and inserting a jumper wire plug into the socket, the jumper wire including a first end having a first jumper wire plug and a second end having a second jumper wire plug, each jumper wire plug configured to be selectively coupled to or removed from the cable plug and the socket.

14. The method as claimed in claim 13, wherein the plug on the cable and the plug on the jumper wire are of the same type.

15. The method as claimed in claim 13, wherein coupling a mounting means to the second end of the cable comprises coupling the mounting means to the second end of the cable such that a protective plate covers the socket when the socket is not plugged with a plug.

16. The method as claimed in claim 15, wherein the protective plate is self-returnably arranged on the mounting means, such that the protective plate is configured to automatically return to an original position to protect the socket by covering the socket in response to any of the cable plug, the first jumper wire plug, and the second jumper wire plug being removed from the socket.

17. The method as claimed in claim 13, wherein coupling a mounting means to the second end of the cable comprises routing the cable through a cable fixing slot.

18. The method as claimed in claim 14, wherein coupling a mounting means to the second end of the cable comprises routing the cable through a cable fixing slot.

19. The method as claimed in claim 15, wherein coupling a mounting means to the second end of the cable comprises routing the cable through a cable fixing slot.

20. The method as claimed in claim 16, wherein coupling a mounting means to the second end of the cable comprises routing the cable through a cable fixing slot.

* * * * *